United States Patent [19]

Ceccarani

[11] Patent Number: 5,713,266
[45] Date of Patent: Feb. 3, 1998

[54] APPARATUS FOR FOODSTUFF MATURING

[75] Inventor: Franco Ceccarani, Milan, Italy

[73] Assignee: Guido Caprotti, London, United Kingdom

[21] Appl. No.: 612,017

[22] Filed: Mar. 5, 1996

[30] Foreign Application Priority Data

Mar. 10, 1995 [IT] Italy ................... MI95A0460
Dec. 13, 1995 [IT] Italy ................... MI95A2604

[51] Int. Cl.⁶ .................. A01J 19/00; A01J 25/00
[52] U.S. Cl. ............................ 99/451; 99/452
[58] Field of Search ............ 99/358, 451, 452–460, 99/331–333, 468, 485, 486, 646 R, 483; 324/307–309, 318, 319; 372/29, 37; 313/421; 315/344; 426/582, 36, 234, 237–240

[56] References Cited

U.S. PATENT DOCUMENTS

| | | | |
|---|---|---|---|
| 4,612,199 | 9/1986 | Miyahara | 426/237 |
| 4,787,303 | 11/1988 | Papchenko et al. | 99/483 |
| 5,031,521 | 7/1991 | Grishko et al. | 99/DIG. 14 |
| 5,227,597 | 7/1993 | Dickens et al. | 99/451 |
| 5,393,541 | 2/1995 | Bushnell et al. | 99/483 |
| 5,447,733 | 9/1995 | Bushnell et al. | 426/237 |
| 5,534,278 | 7/1996 | DeRuyter et al. | 99/451 |
| 5,603,858 | 2/1997 | Wyatt et al. | 99/DIG. 14 |
| 5,607,710 | 3/1997 | DeRuyter et al. | 426/237 |

FOREIGN PATENT DOCUMENTS

| | | |
|---|---|---|
| 0477774 | 4/1992 | European Pat. Off. |
| 814383 | 9/1951 | Germany |
| 8705470 | 9/1987 | WIPO |
| 8809623 | 12/1988 | WIPO |

OTHER PUBLICATIONS

Abstract of SU–A–990 165 Published in 23 Jan. 1983 by Derwent Information (ID, AN: 83 819180).

Patent Abstracts of Japan, vol.007 No. 161 (C–176) 15 Jul. 1983 & JP–A–58 071881 (Norihei Hatae), 28 Apr. 1983.

*Primary Examiner*—Timothy F. Simone
*Attorney, Agent, or Firm*—Browdy and Neimark

[57] ABSTRACT

The apparatus comprises at least one panel container (12) carrying a plurality of air-core solenoids (3) connected individually or by groups to respective generators adapted to supply the solenoids (3) with such pulsating currents that relative magnetic fields are created on the supported products (2) adjacent to the panel containers (12). The panel containers (12) can be movable and the containers themselves can carry the products (2) to be submitted to maturing. The process provides for products (2) to be submitted to the action of low-frequency pulsating polarized magnetic fields during their maturing cycle. The intensity and/or frequency of the fields is adjusted depending on the amount of liquid and/or weight and/or type of product being matured. The action of the pulsating magnetic fields on the products (2) leads to an important reduction in the maturing times and an improved quality of the final products.

26 Claims, 5 Drawing Sheets

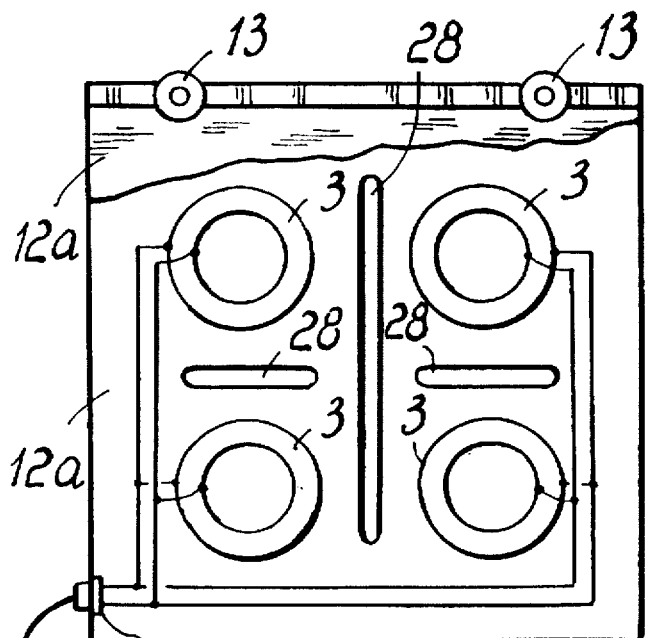
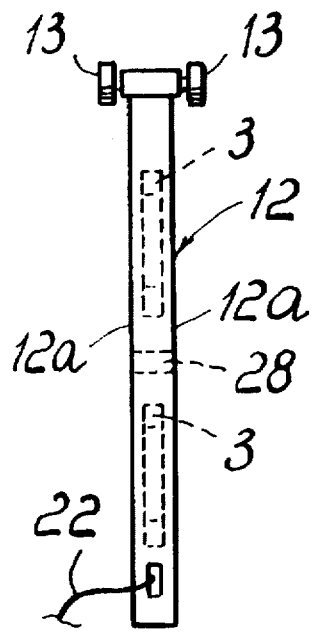
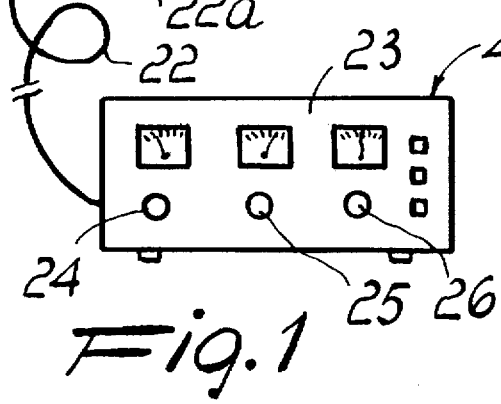
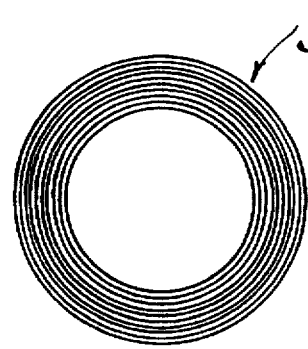
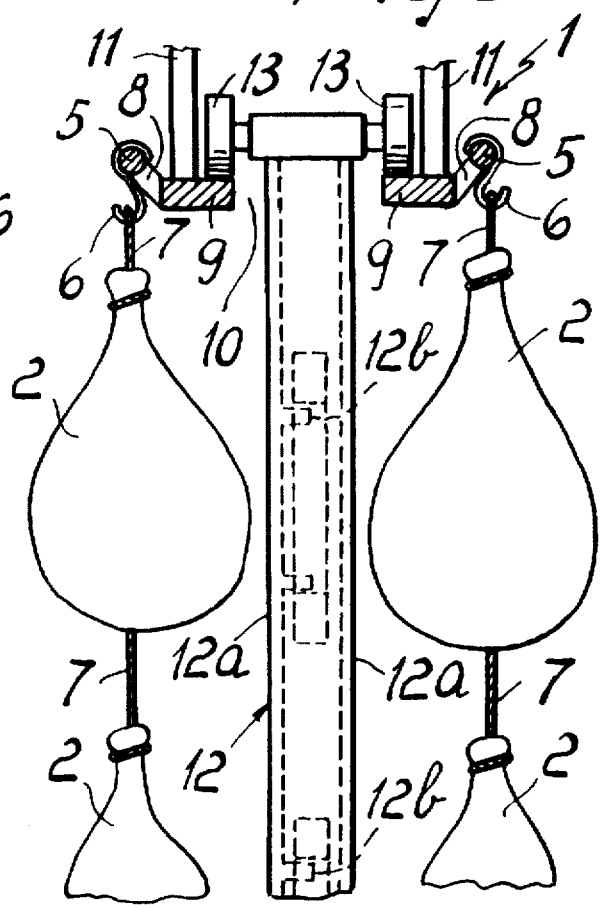

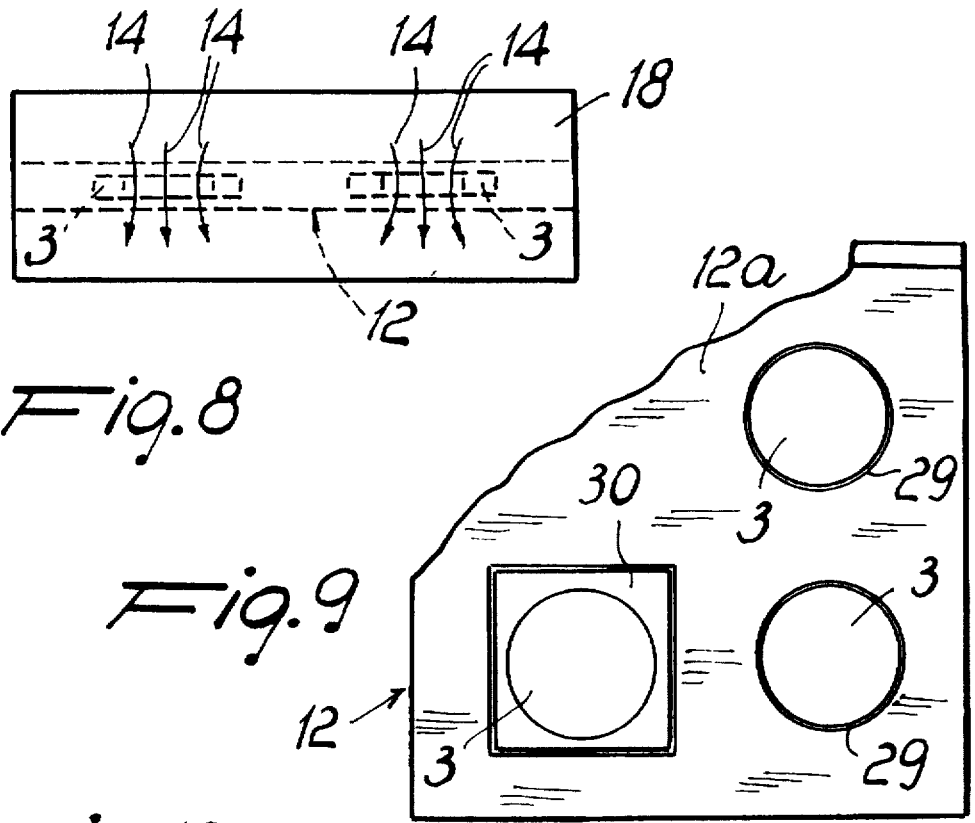
Fig. 8
Fig. 9
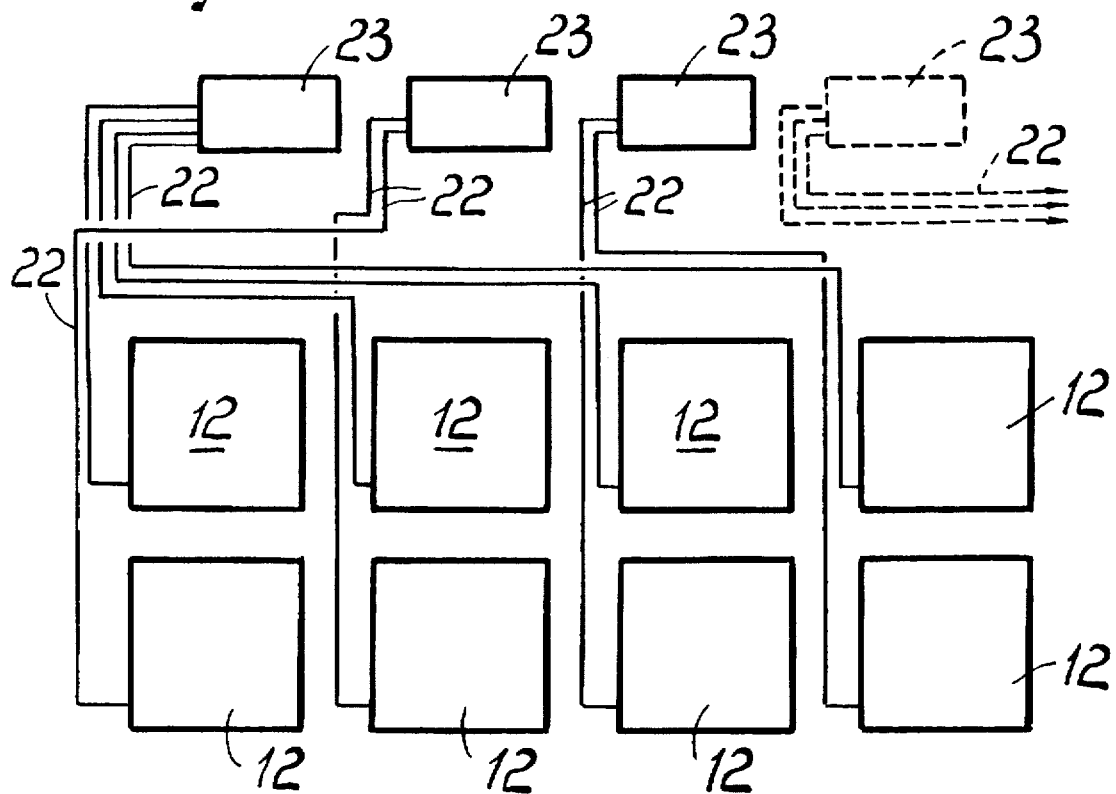
Fig. 10

APPARATUS FOR FOODSTUFF MATURING

BACKGROUND OF THE INVENTION

The present invention relates to an apparatus for foodstuff maturing, in particular maturing of unprocessed or processed meats and dairy products.

It is known that treatments carried out for example either on unprocessed animal meats for obtaining hams, smoked hams, cured raw beef and the like, or on processed meats for obtaining various kinds of sausages and salami, as well as the production of dairy products such as cheeses of different types, for example Parmesan, fontina, emmental, pecorino, provolone cheese and still other types, involve a maturing step of a duration of several months, before the goods have reached the required qualities for sale and consumption.

In particular hams, after being salted, are allowed to stand in refrigerating rooms for some weeks and then maintained in hot rooms in which they lose weight, specifically water and humidity, over one or two months. Following this step, called prematuring step, there is the true maturing step lasting several months, and taking place in appropriate environments, in contact with the air. This duration varies depending on the type, weight, sizes and liquid content of the hams, but it can be hardly shorter than six months. For hams of high quality it normally has a duration of 12 to 18 months.

Likewise, fresh cheeses, as soon as they come out of the moulding and salting process, are allowed to mature in contact with the air over periods that can reach even two years in the case of Parmesan cheese.

The availability of environments adapted to the maturing process and the long immobilization of the goods involve important costs that necessarily adversely affect the cost of the final product. It has been in fact calculated that in the case of Parmesan cheese for example, these costs have an incidence of about 35% on the cost of the final product, that is more than one third of the total amount.

Attempts have been made to reduce these maturing times to some extent, for example by letting hot air circulate in the maturing environments or even by a non-observance of the limits established for a correct maturing, but these expedients inevitably bring about worsening in the product quality.

In the case of meats, attempts have been made to increase profits starting from import meats, generally less expensive, but these attempts too have given rise to poor-quality products, above all where in combination with a reduction in the maturing times.

It is also to be considered that very often a regular and correct maturing is not reached by all products: part of them in fact, when they are standing in the maturing rooms, can undergo a decay that will inhibit the maturing process and will oblige to discard the whole product. A money loss will result therefrom and, depending on the rejected percent, said loss can be of importance too, and in any case it represents another factor leading to an increase of the final product costs.

Problems connected with maturing duration also exist for processed meats, such as sausages, though to a lower degree, in that in this case maturing times are generally shorter. Depending on the type and sizes of salami and leaving out of consideration the type of process applied to the meat before the maturing step, maturing times of 20 to 90 days are necessary, on an average. In spite of that, in this sector too there is often a tendency not to complete the prescribed or most appropriate maturing periods and the standing times for the product are shortened in an attempt to increase profits to the detriment of the quality of the product put on the market.

Maturing of hams and similar products generally takes place keeping the products hanging from hooks carried by overhead guides or rails in the maturing rooms. Normally two rows of products are provided on symmetrically opposite sides relative to a vertical median plane. The products may be caused to slide along the guides or rails between different rooms, in which different treatment conditions are maintained, and are allowed to stand in the different rooms for the prescribed times.

Maturing of sausages, pork, goose and wild boar salami for example, is instead usually carried out keeping the product hanging from bars supported on movable carriages in the maturing rooms. The bars carrying the product rows are generally arranged in two superposed planes, each receiving a plurality of bars.

In the case of dairy products, instead, cheeses generally in the shape of a wheel or cylinder (also referred to as shaped pieces of cheese) much bigger in width than in height, are disposed side by side, laid down on aligned and superposed shelves in the maturing rooms. Shelves are usually of wood material. Cheeses are accessible from corridors disposed between the different rows of superposed shelves, for checking the maturing state and optionally periodically overturning the cheese cylinders for achievement of a more uniform maturing.

In some cases, such as for provolone for example, cheeses are hanging from a supporting structure and are allowed to mature in such a position.

From the foregoing it is apparent that for maturing either of unprocessed or processed meats or of dairy products, it is not the necessary equipment that affects the costs of the final product to an important degree, but it is above all the long maturing times that have a decisive weight thereon, as these times are indispensable for the achievement of quality products.

SUMMARY OF THE INVENTION

The main object of the present invention is to provide an apparatus for foodstuff maturing, in particular maturing of unprocessed or processed meats and dairy products, by which it is possible to greatly reduce the prescribed or usual times for maturing, without involving worsening or decay in the quality of the matured products.

Another object of the invention is to provide an apparatus for foodstuff maturing by which products of a better quality than the corresponding current products can be obtained, even with maturing periods shorter than those presently employed for the same products.

A further object of the invention is to provide a maturing apparatus by which it is possible to substantially increase the stability of the products during the maturing process, that is to substantially reduce the percentage of the products subject to decay during the maturing step and therefore susceptible of discarding.

A still further object of the present invention is to provide an apparatus accomplishing maturing with a reduced waste of efforts and costs for construction.

Yet another object of the invention is to accomplish a maturing apparatus that can be adapted to the traditional maturing environments and is suitable for several different types of products without involving particular difficulties and important modifications to the known structures.

A still further object of the invention is to provide a maturing apparatus enabling the achievement of matured products of excellent quality even starting from less valuable meats, and always with reduced maturing times compared with those presently typical for the same products.

A still further object of the invention is to create an apparatus adapted for maturing both of big and small amounts of goods.

A further by no means last, object of the invention is to provide a maturing apparatus capable of being easily operated and used by those assigned to the maturing operations and carrying out checking and inspection of the maturing process.

The foregoing and further objects that will become more apparent in the following, are attained by an apparatus for foodstuff maturing, in particular maturing of unprocessed or processed meats and dairy products, as claimed in the appended claims.

BRIEF DESCRIPTION OF THE DRAWINGS

More details of the invention concerning construction and operation will become more apparent from the following description in which some preferred embodiments of the invention are illustrated by way of non-limiting examples, with reference to the accompanying drawings, in which:

FIG. 1 shows a panel-shaped container carrying the solenoids of an apparatus according to the invention in a front and partly cut away view, according to a first embodiment;

FIG. 2 is a side view of the same panel-shaped container;

FIG. 3 shows a detail of a support and guide system for the panel-shaped container on the bearing structure carrying the products to be matured;

FIG. 4 is a front view of one of the air-core solenoids used in the apparatus of the invention;

FIG. 8 is a diagrammatic top view of the course of the lines of force of the pulsating magnetic field during foodstuff maturing;

FIG. 9 shows two alternative solutions for housing the solenoids in the panel-shaped container;

FIG. 10 shows an arrangement and operation diagram of an apparatus according to the invention provided with a plurality of panel-shaped containers for treatment of the products;

DETAILED DESCRIPTION OF THE INVENTION

Figure 5:
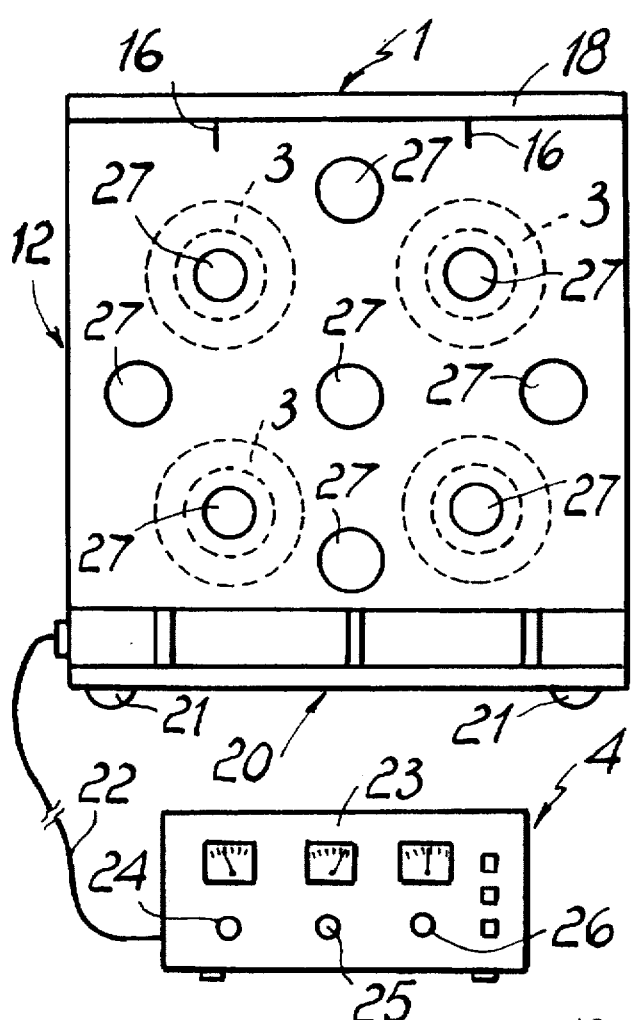
FIG. 5 is a front view of a panel-shaped container in another embodiment.

With reference to the accompanying drawings, an apparatus according to the invention essentially comprises at least one bearing structure 1 for the products 2 to be submitted to maturing, said products being removably applied to structure 1. The products 2 can be either unprocessed meats previously treated and prepared for maturing, such as hams, smoked hams, cured raw beef and the like, or processed meats for obtaining various kinds of sausages and salami, also prepared following traditional methods and techniques for maturing, or dairy products, in particular medium and long-maturing cheeses such as Parmesan, fontina, emmental, pecorino, provolone and other types of cheeses and foodstuffs in general, needing a maturing process involving standing of the products in environments in contact with the air and often under predetermined temperature and humidity conditions, in which the products in particular lose water and humidity, over more or less prolonged periods of time, the minimum values of which are generally preestablished by specific standards.

For treatment of the products 2 during the maturing step it is provided, in accordance with the invention, that the products 2 be submitted in said environments or rooms and at least temporarily to low-frequency pulsating polarized magnetic fields. In fact, it has been surprisingly found that the action of this type of magnetic field enables the biological maturing process of the products 2 to be accelerated, so that the maturing times are greatly reduced as compared with the traditional ones, being, as a result, also reduced the incidence that these times have on the costs of the matured products, without causing any decay in the product quality and on the contrary bringing in an important quality improvement and in particular improving the flavour of the matured products. Tests carried out by persons skilled in the art following the prescribed modalities and instruments, have brought to judge as ready for consumption and of excellent quality, products matured in greatly shorter periods of time than the traditional ones for the same products, by means of these magnetic fields. Data given in the following better clarify the operating modalities and the achieved results. For the purpose, close to the bearing structure 1, air-core solenoids 3 have been arranged, that is solenoids devoid of an iron core, to be connected individually or by groups to respective electric sources 4 adapted to generate low-frequency pulsating polarized magnetic fields at the solenoids 3.

In more detail and referring first to FIGS. 1 to 4, the bearing structure 1 is comprised of at least one pair of support guides 5, in the form of bars or rails of the traditional type, arranged in the maturing room and spaced apart so as to support respective rows of products 2, for example hung by means of hooks 6 and ropes 7, so that the products 2, e.g. hams as shown, can be easily applied to the support guides 5 and removed therefrom.

The support guides 5 can be fastened by arms 8 to a fixed bearing structure having a pair of guide rails 9 defining a free space 10 between them and kept suspended from the maturing room ceiling by vertical tie-rods 11. The guide rails 9 support, preferably in a slidable and/or removable manner, at least one hollow panel container 12, vertically suspended through the space 10. For sliding in the guide 5 direction the panel container 12 can have pairs of projecting rollers 13 for running on and along the guide rails 9; said rollers 13 for easy application and removal of the panel container 12, can be spring stressed in an outwardly axial direction in the operating position shown, but they are retractable for displacement of the panel container 12 in a direction perpendicular to the running one, in order to enable slipping off of the panel container 12 through the space 10. Then, arranged between the product 2 rows there is at least one panel container 12 which has a substantially parallelepiped configuration and the major faces 12a of which face the products 2.

Placed inside the panel container 12 is at least one solenoid 3 the axes of which are disposed substantially perpendicular to the major faces 12a of the panel container 12 and such arranged that magnetic fields are generated that have a generally uniform distribution at the major faces 12a of the panel container 12 and therefore at the products 2. Solenoids consist of windings of a hollow cylindrical form in which the diametrical size prevails over the axial one, as shown in the drawings for example. The winding is made of cylindrical layers in succession. Each solenoid 3 can be held fixedly in position by an annular relief 12b for example provided in one of the panel container faces 12a. In any case, the panel container or containers 12 has/have such a mutual arrangement relative to the products 2 that the products are passed through or at all events concerned with the lines of force 14 of the pulsating polarized magnetic fields generated by solenoids 3, as diagrammatically shown in FIGS. 8 and 14.

Figure 6:
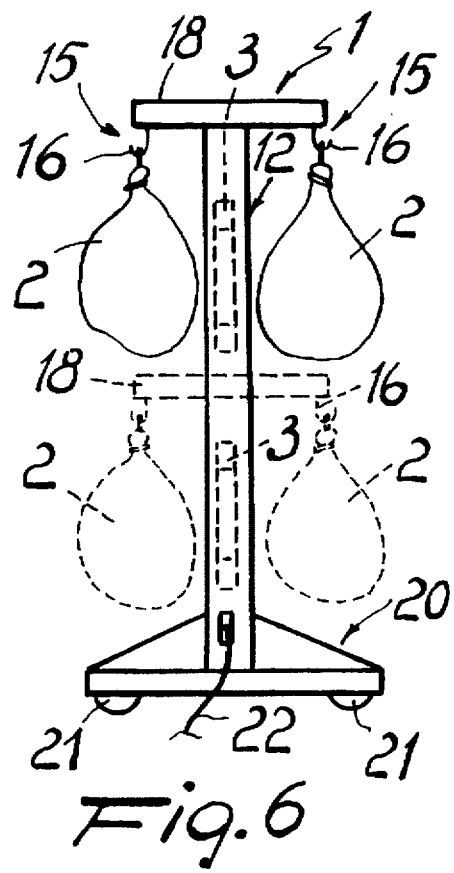
FIG. 6 is a side view of the panel-shaped container of FIG. 5 in an operating step.
Figure 7:
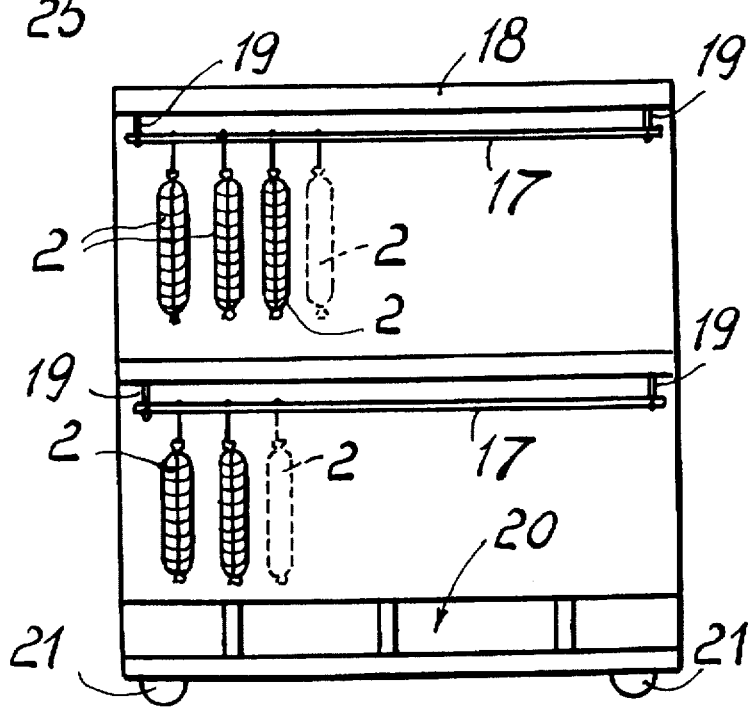
FIG. 7 is a detail of a panel-shaped container in particular appropriate for maturing of sausages.

In the embodiment shown in FIGS. 5 to 7, the bearing structure 1, on the contrary, is comprised of a plurality of support elements 15 for the products 2 to be submitted to maturing, these elements 15 being directly carried by the panel container 12, which is movable and slidable together with the products 2 suspended from elements 15. In particular, elements 15 can consist of hooks 16, disposed according to rows projecting from opposite sides of the panel container 12, preferably at at least two levels, as diagrammatically shown in FIG. 6. Alternatively, the support elements 15 can comprise support bars 17 for the products 2, removably supported by the panel container 12, as diagrammatically shown in FIG. 7. This solution is particularly appropriate for maturing of sausages.

The hooks 16 are fastened to an upper crosspiece 18 projecting from the major faces 12a of the panel container 12. The bars 17 are for example arranged on hooks 19 in turn fastened to the upper crosspiece 18.

The movable or slidable panel container 12 on its lower part has a base 20 provided with movement wheels 21 to cause running of the panel container 12 on the ground or on rails, so as to enable displacement of same from one place to another, in particular between different maturing rooms, or to allow the products 2 to be loaded or unloaded at the outside of the true maturing rooms.

Also in the embodiment shown in FIGS. 5 to 7, the panel container 12 has an arrangement of solenoids 3 inside it, as already described with reference to the panel container 12 in FIGS. 1 to 4. As a simplified solution, only one solenoid 3 may be provided, but for economical reasons a solution involving several solenoids 3 for each panel container 12 is preferred and the panel containers 12 are of a modular type to be employed either in the suspended form (FIGS. 1 to 4) or in the form of a carriage (FIGS. 5 to 7) with the only addition of the necessary elements for this purpose.

The solenoids 3 of each panel container 12 are electrically connected with each other in series or in parallel or by serial/parallel connections and the connecting conductors terminate for example at a socket 22a provided in each panel container 12. Through the socket 22a the panel containers 12 can be electrically connected by cables 22, individually or by groups, to respective power sources 4, formed of, or gathered in, a generator device 23 that can be located at a remote position from the panel containers 12 and is designed to produce a low-frequency pulsating current, for example at 50 Hz, eliminating the negative half wave of an alternating current of a single-phase-current supply network. Current supplied to the solenoids 3 is in any case unipolar, that is always of same polarity, so that the solenoids produce polarized magnetic fields, that is fields always directed in the same direction, though they have an intensity varying in a pulsating manner.

The or each generator 23 preferably has means 24 for adjusting the pulsating current intensity and means 25 for adjusting the pulsating current frequency. The or each generator 23 may be also provided with adjustable timer means 26 to automatically power the panel containers 12 over predetermined periods of time, all the above means being of a type known per se and therefore not described in detail.

Alternatively, each panel container 12 can be equipped with a generator of its own having the above described features, and the generator can be applied to or incorporated into the panel container 12.

The remote arrangement of the generator/generators 23 relative to the panel containers 12 advantageously enables movement of the panel containers 12 independently of the generator/generators 23 and control of the individual panel containers 12 or panel container groups and the related solenoids 3 from a single point. Replacement of the individual panel containers 12 is also possible without any intervention on the generator/generators 23 being necessary.

Shown in FIGS. 11–16 is an apparatus adapted for maturing of dairy products, in particular medium and long-maturing cheeses, in which the bearing structure 1 is comprised of maturing shelves 32, in particular a plurality of superposed maturing shelves 32, each adapted to carry a plurality of cheeses 33, in particular shaped pieces of cheese such as Parmesan, emmental, fontina, pecorino and other similar cheeses.

Usually provided between the rows of superposed maturing shelves 32 are corridors for access to the products 2 in order to check the maturing process of same and, if necessary, periodically overturn the cheeses 33, in known manner.

The maturing shelves 32 are generally of wood material, in particular pinewood, and are supported by posts 35, through brackets 34, for example. The cheeses 33 are generally of cylindrical shape, laid down on the bases in side by side relation along the shelves 32.

The solenoids 3 similar to those of the preceding embodiments are housed in one or more panel containers 12 to be fastened to the maturing shelves 32 and substantially in the form of a parallelepiped. The solenoids 3 are arranged within the panel containers 12 with their axes substantially perpendicular to the major faces 12a of the panel containers 12.

Figure 11:
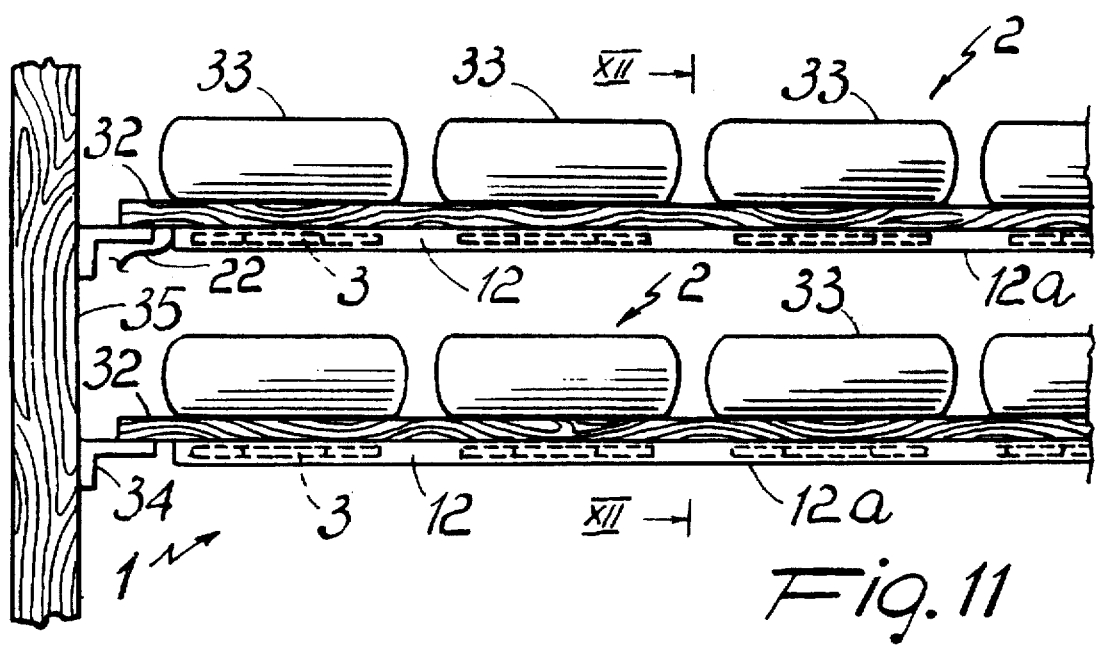
FIG. 11 is a diagrammatic side view of another embodiment of part of an apparatus according to the invention.
Figure 12:
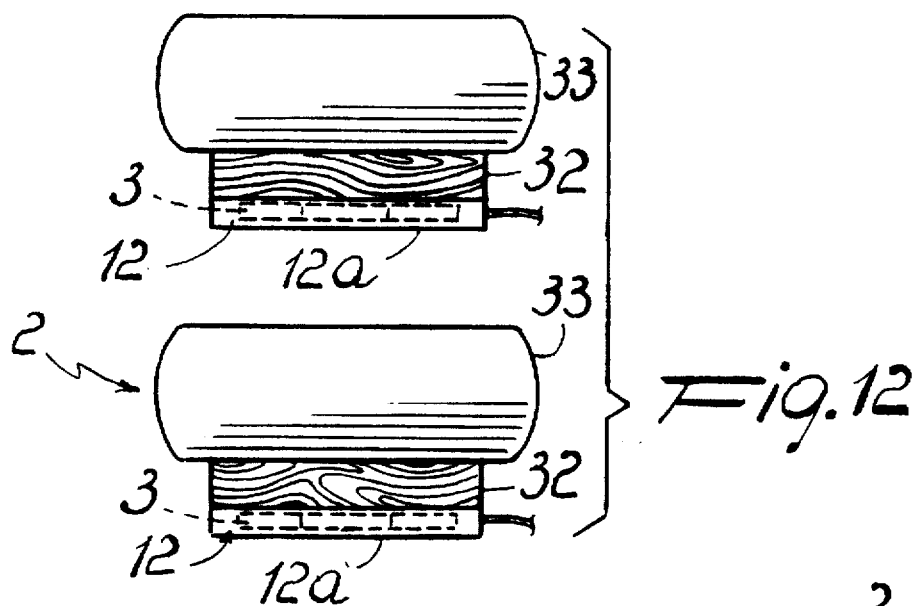
FIG. 12 is a view taken along line XII—XII in FIG. 11.
Figure 13:
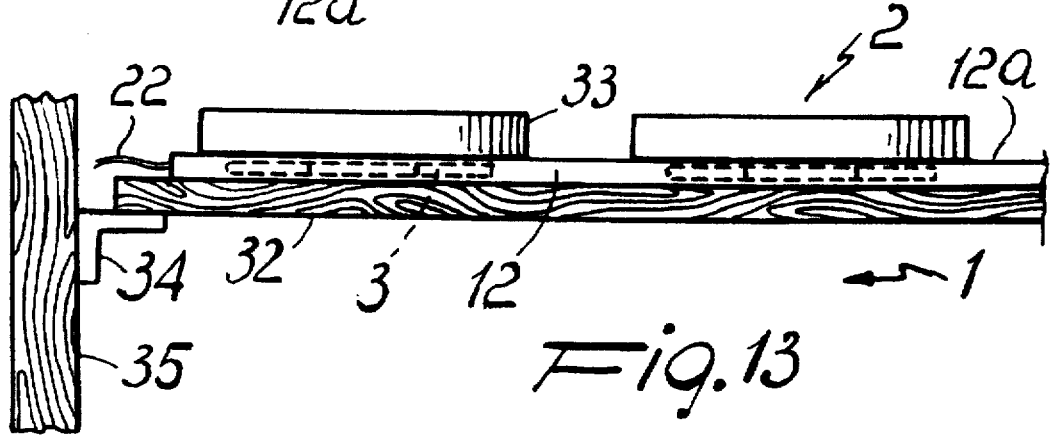
FIG. 13 is a diagrammatic side view of another embodiment of part of an apparatus according to the invention.

The panel containers 12 can be fastened either in a stable or a removable manner, each to the lower or upper sides of the maturing shelves 32, as shown in FIGS. 11 and 13, for example, the major faces 12a thereof being parallel to the shelves 32. In the case of a removable arrangement, the panel containers 12 can be for example transversely slidable relative to the shelves 32 along appropriate guides, so that they can be slipped off, if necessary. In a simplified solution, one panel container alone 12 can be provided for each shelf 32 and it extends over the whole length of the shelf. The panel container 12 width can be the same as, or smaller than that of the shelves 32, depending on the diametrical sizes of the cheeses 33 being matured.

Figure 14:
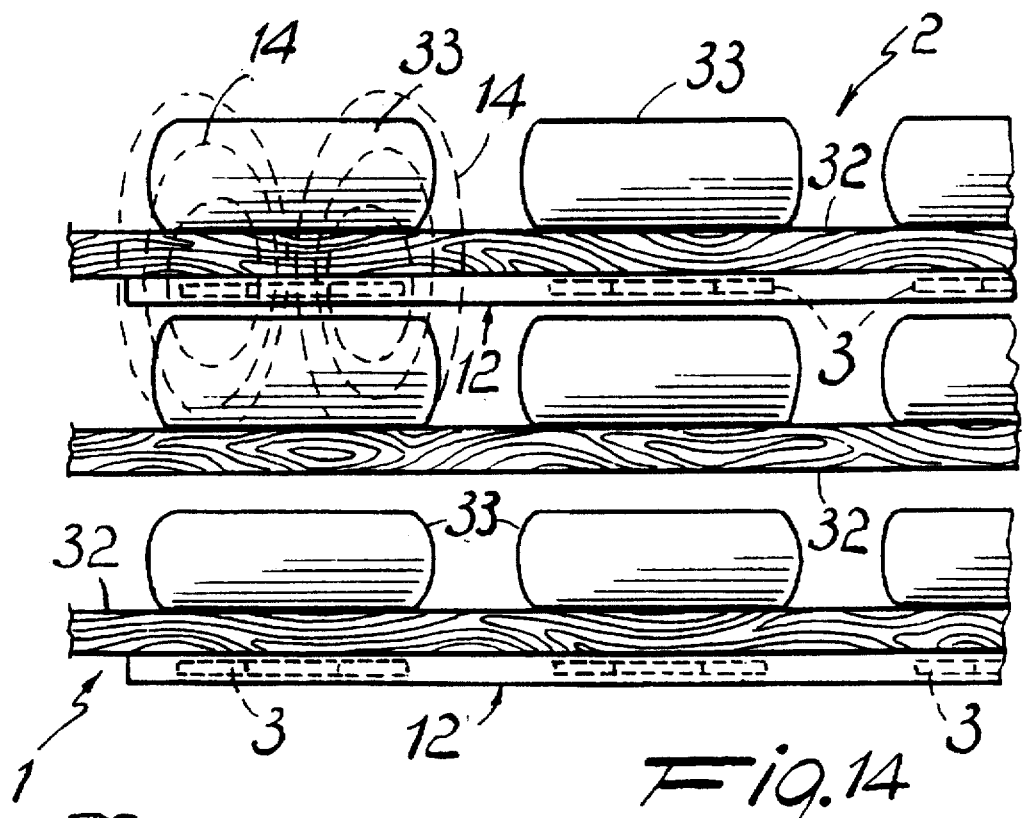
FIGS. 14, 15 and 16 show other possible arrangements of the solenoids and/or panel-shaped containers in a maturing apparatus according to the invention.

In the case of maturing shelves 32 disposed very close to each other with respect to the height of the cheeses 33, the panel containers 12 can be disposed under the maturing shelves 32 in an alternated manner, that is one panel container every two shelves, as the short interval between them enables one and the same solenoid 3 to act substantially in the same manner both on the overlying product and on the underlying one, as shown in FIG. 14.

In particular, in a use position, the solenoids 3 and/or panel containers 12 are secured to the maturing shelves 32 in such a manner that the solenoids 3 are disposed substantially in coaxial relation with the cheeses 33, so that the latter are passed through in the most uniform manner or in any case uniformly concerned with the lines of force 14 of the pulsating polarized magnetic fields generated by the solenoids 3, as diagrammatically shown in FIG. 14.

In this embodiment too the solenoids 3 of each panel container 12 are electrically connected with each other in series or in parallel or by serial/parallel connections, and the connecting conductors terminate at a socket provided in each panel container 12 for example, by which the panel containers 12 can be electrically connected individually or by groups, through cables 22, to the respective power sources 4 comprising at least one generator device 23, as in the already described embodiments.

In its practical use, for maturing of unprocessed or processed meats, such as hams and sausages, or dairy products, such as medium and long-maturing cheeses, the apparatus is such adjusted that it produces pulsating polarized magnetic fields preferably at 50, 60 or 100 Hz frequencies. The average field intensities, measured with a gaussmeter or Hall probe at the inner holes of the solenoids 3, preferably are about 20-80 Gauss, with peak values of 80-300 Gauss, depending on the water content, the type, sizes, shape and wrinkling degree of the product. Obviously, different values are also possible.

The treatment steps with a pulsating magnetic field of the type specified can be alternated with traditional treatment steps, that is it is possible to stop the magnetic action on the products over more or less prolonged periods, or treatment with a pulsating magnetic field can be carried out in addition to the traditional treatment.

The treatment times and the intensity and/or frequency values can be stored in a central unit adapted to consequently and automatically control the different generators 23 to supply the different values for the required time.

The pulsating magnetic fields to which the products 2 are submitted can be selectively adjusted for each product 2 or for groups of products 2. The average intensity and/or frequency of the pulsating magnetic field acting on a given product 2 or group of products 2 can be maintained constant during the whole maturing process or modified during the maturing cycle, in a progressive manner for example. In particular the average intensity and/or frequency can be reduced in the progress of maturing. The frequency variation is preferably included between 50 and 100 Hz.

The maturing process and apparatus for foodstuffs involving application of low-frequency pulsating polarized magnetic fields as above described enable very surprising effects and results to be achieved. From the carried out tests in fact it came out that it is possible to greatly reduce the maturing times as compared with the traditional ones for the same products, bringing them to a half or even one third or less of the traditional ones and at the same time improving the product quality as well. Tests conducted on products submitted to traditional maturing methods and on products treated with the apparatus according to the present invention, and executed by professional tasters, have unambiguously confirmed the best quality, in terms of flavour and taste, of the products treated with the process and apparatus according to the present invention. It was also ascertained that the same judgements of better quality could be also achieved on matured products in which the starting meats were of inferior quality with respect to those usually employed for obtaining quality products, based on the regulations in force.

By adopting the treatment apparatus according to the invention it was also possible to notice that exceptional maturing results can be reached also in environments otherwise inappropriate for conventional maturing. In fact it was possible to ascertain that products not treated according to the present invention progressively were subjected to decay in the same place where the products treated with said pulsating magnetic fields could complete maturing with excellent results, and also in very short periods of time. In particular, no cheese submitted to maturing in the apparatus of the invention was subjected to decay, but all cheeses completed the maturing process in a regular and correct manner. In this way, no discarding of the products took place.

A treatment according to the invention applied to hams type "Parma" or "Langhirano" that usually need a standing of at least 12 months for maturing, has enabled the obtention of products of same or even better quality after only 3-4 months.

Equivalent results were also obtained when treating sausages, in particular pork, goose or wild boar salami, as compared with presently used treatments.

Shaped pieces of fresh Parmesan, treated by the apparatus according to the invention immediately after the salting process, appeared to be ready for consumption and of excellent quality after only seven months, instead of the traditional two years, based on judgements expressed by experts in the sector that carried out the usual tests involving knocking, probe insertion, examination of taste, flavour and smell as prescribed by the regulations in force. Some examples will further clarify the results and advantages achieved by the invention.

EXAMPLE 1

Different samples of the products identified in Table 1 were submitted to maturing. Some were allowed to mature in the traditional manner, others were submitted to the treatment with a polarized magnetic field according to the present invention, and reached maturing much quicker, as the different maturing times shown in the table below prove.

TABLE 1

| Product being matured | Normal maturing time without magnetic field (days) | Maturing time with magnetic field (days) |
| --- | --- | --- |
| Wild boar salami | 25-30 | 14-15 |
| Goose Salami | 30-35 | 18 |
| Roe deer ham | 75 | 50 |
| Wild boar ham | 60 | 28-40 |
| Deer ham | 70-75 | 32 |
| Cured raw horse meat | 65-70 | 34 |

Each product treated with a magnetic field according to the invention revealed a positive difference in taste, flavour and smell as compared with the untreated control products.

During the comparative tasting tests differences could be noticed in colouring; colouring and consistency were always in favour of the treated products.

The wild boar salami treated with a magnetic field according to the invention did not give rise to the formation of a white patina typical of this product, resulting from the dehydration phenomenon and the consequent humidity present on its outer surface.

The field frequency was 50 Hz. The average intensities were about 40 Gauss.

Other data relating to some of the samples in reference are given in the following table.

TABLE 2

| Product being matured | No. of samples | Traditional ring WEIGHT OF THE PRODUCT (Kg) | | Maturing according to the invention WEIGHT OF THE PRODUCT (Kg) | |
|---|---|---|---|---|---|
| | | Initial | Final | Initial | Final |
| Wild boar ham | 5 | 7.660 | 5.100 | 6.800 | 4.200 |
| Deer ham | 5 | 12.480 | 7.920 | 10.780 | 6.360 |
| Cured raw horse meat | 10 | 30.750 | 15.880 | 29.500 | 15.580 |

The weight difference was verified during the maturing period of the treated products; therefore it is not the final difference, even if the greatest loss of weight takes place in the first maturing period, because actually each product goes on undergoing transformation until the expiry date of same.

EXAMPLE 2

Some shaped pieces of Parmesan cheese after completion of the salting period were submitted to treatment by a pulsating polarized magnetic field with a semi-sine wave at 50 Hz. From the first days one could see a greater maturing activity: e.g. the shaped pieces of cheese showed a greater ejection of liquids compared with the shaped pieces of the same cheese not subjected to the magnetic field treatment.

After constant and periodical checks, eight months after the production date the shaped pieces were submitted to inspection by experts in the sector. On this occasion the perfect quality of same could be ascertained: the cheese pieces had such a taste, flavour, smell and consistency that the optimum edibility of said cheese was declared. It was not the same for the cheese pieces not treated according to the invention which had been allowed to mature in the traditional manner.

On that occasion the experts decided to inspect the treated shaped pieces of cheese again after twelve months from the production date, in order to evaluate the possible complete maturing of same, that is their being "ready for grating". It was then ascertained that in about twelve months the treated cheeses reached their complete maturing.

During the treatment period the field intensities (base constants, about 40–50 Gauss average values) were sometimes changed depending on the different environmental conditions: temperature decrease, variation of humidity in the air.

From the foregoing it is apparent that the great reduction of the maturing time of the products without prejudice to the quality of same, but with an important quality improvement, and the complete absence of discarded products, involve an important economical advantage, whereas costs for construction, setting up and operation of the apparatus of the invention are particularly contained and can be quickly amortized.

In fact the apparatus has a particularly simple structure, that can be either applied to the traditional maturing plants with few modifications or directly utilized in the same plants. The apparatus can be made in a modular form, which makes it possible to quickly replace possible panel containers in which operation anomalies have occurred. The panel containers' control carried out individually or by small groups enables the treatment conditions to be easily adapted to different local requirements or the magnetic action to be modified in the progress of maturing over distinct areas in big maturing plants.

With a single treatment panel container it is possible to operate on a plurality of products simultaneously, which will bring about undoubted economical advantages. In fact, in order to reduce costs it is important to be able to treat the greatest number of products.

For example, one and the same panel container can be used both for maturing hams, salami or cheeses, by merely adjusting the intensity and/or frequency of the pulsating magnetic fields and/or changing the treatment times.

The panel containers and/or solenoids' size can vary depending on the surfaces requiring to be treated with a magnetic field, that is substantially in relation to the volume of the products 2 to be submitted to treatment. The panel containers 12 for treatment of meats can be of a length and height of 1 m and a thickness of about 2–3 cm and contain four to six solenoids 3, for example. The panel containers 12 for treatment of dairy products can have different lengths and heights depending on the sizes of the maturing shelves.

Panel containers of a thickness of about 2–3 cm can be located without problems in the space between two maturing shelves 32 in known plants, taking into account the products' height. The panel containers 12 are preferably made of non-toxic plastic material or wood, in any case of non magnetic material. They preferably have through holes 27 or slits 28 in their major faces 12a for best air circulation and ventilation of the products, the holes 17 and/or slits 28 being disposed in the panel container regions not occupied by the solenoid bodies. Said solenoids 3 can be received in appropriate seatings 29 formed in the major faces 12a of the panel containers 12, or be carried by appropriate frames 30 arranged in a removable manner in corresponding seatings of the panel containers 12, as shown in FIG. 10.

Figure 15:
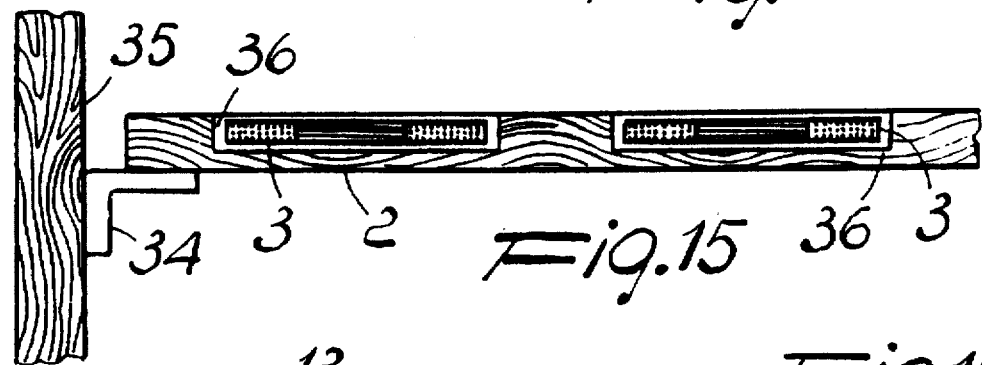
Figure 16:
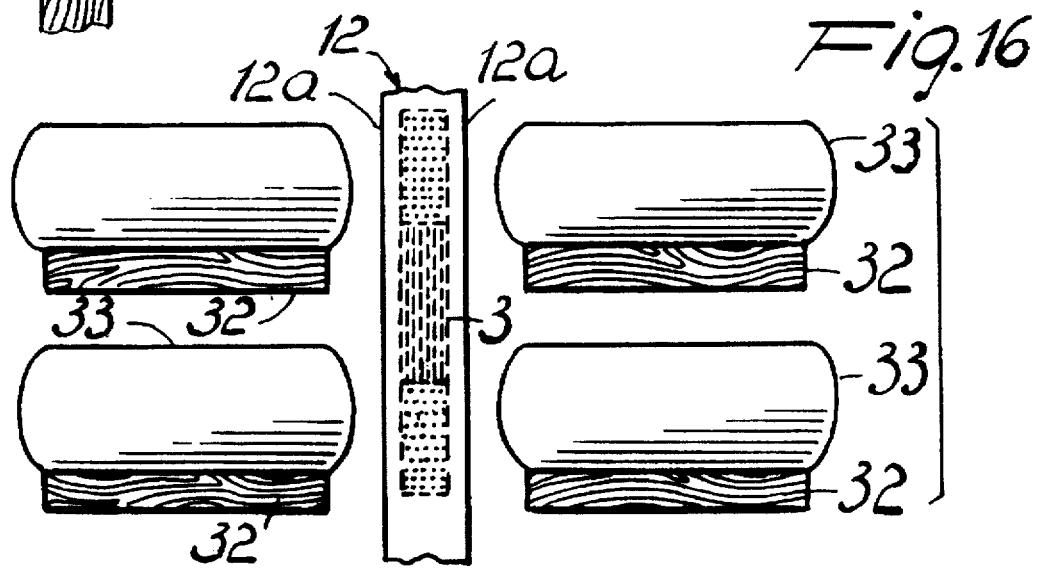

Alternatively, it is also possible to form appropriate seatings 36 in the maturing shelves 32 where the solenoids 3 are secured, as shown in FIG. 15, or to arrange the panel containers 12 with their major faces 12a substantially at right angles between adjacent maturing shelves 32, as diagrammatically shown in FIG. 16.

The vertical arrangement of the panel containers 12 is particularly appropriate when the dairy products instead of lying on horizontal maturing planes are suspended from a bearing structure, such as in the case of provolone. That is to say that the panel containers 12 can be disposed between two rows of suspended dairy products, so that the solenoids 3 act symmetrically on the products disposed at the opposite sides of the panel containers 12.

A typical apparatus according to the invention preferably is comprised of a plurality of modular panel containers 12 of the described type, to be removably arranged at a maturing line, or the containers themselves can carry the products 2 to be matured, the different panel containers 12 being suitable for connection or electrically connected, individually or by groups, to one or more control generators 23 adapted to supply the appropriate currents for generation of the required pulsating magnetic fields, according to the exemplary diagram in FIG. 11, with the facility of selectively connecting and disconnecting the different panel containers 12 or groups of panel containers 12, in addition to selectively adjusting the intensity and/or frequency of the generated pulsating magnetic fields, so as to adapt it to the different products 2 or groups of products 2 simultaneously or at different times.

The use of the apparatus according to the invention does not require the intervention of qualified staff, once the most appropriate treatment values and times for the products by turn submitted to maturing have been established and/or programmed.

From the above description it is apparent that the apparatus according to the present invention achieves all objectives aimed at in the first part.

While the particular case of meats and cheeses has been illustrated, the invention is not limited to these goods alone, as it can be successfully employed for other goods as well, that are usually allowed to mature before they reach the conditions suitable for consumption.

Many modifications and variations can be made to the apparatus, all of them falling within the scope of the inventive idea. Thus, for example, the body carrying the solenoids 3 could have a different configuration from the one involving a panel container, being instead formed of a framework carrying several solenoids 3. The latter could be disposed in an interchangeable manner in the panel container 12 or the carrying framework. The solenoids 3 could also be disposed with a vertical axis, that is an axis parallel to the major face 12a plane of the panel container 12 or the carrying framework, so that the lines of force of the magnetic field shall be in any case closed through the products to be matured. The solenoids 3 could also be arranged buried in a panel container of a solid structure instead of a hollow one. In place of the pairs of support guides 5, a single guide could be provided. The apparatus could also or exclusively be comprised of fixed panel containers directly carrying the products to be submitted to maturing.

One generator 23 for each maturing shelf 32 could be also provided, being disposed at the end of the shelf itself, for example. The panel containers 12 could be open on their side to be fastened to the maturing shelves 32.

What is claimed is:

1. An apparatus for maturing foodstuff products, particularly processed meats, unprocessed meats and dairy products, comprising at least one bearing structure for supporting said products to be submitted to maturing, at least one air-core solenoid associated to said at least one bearing structure and said products, and at least one power source for energizing said at least one solenoid, said at least one power source providing a low-frequency pulsating current for generating a low-frequency pulsating polarized magnetic field at said at least one solenoid.

2. An apparatus according to claim 1, further comprising at least one panel container housing said at least one solenoid, said at least one panel container having a substantially parallelepiped configuration and two opposite major faces, said at least one solenoid having an axis disposed substantially perpendicularly to said major faces.

3. An apparatus according to claim 1, wherein said bearing structure comprises at least one pair of support guides disposed spaced apart from one another for supporting respective rows of said products, and wherein said at least one solenoid is housed in at least one panel container arranged between faced rows of products.

4. An apparatus according to claim 3, wherein at least one panel container is arranged movably or removably relative to said support guides.

5. An apparatus according to claim 3, wherein said support guides comprise overhead rails.

6. An apparatus according to claim 1, in which said at least one bearing structure comprises a plurality of support elements for said products, and wherein the apparatus further comprises at least one panel container carrying said support elements and having a substantially parallelepiped configuration, said at least one panel container further housing said at least one solenoid.

7. An apparatus according to claim 6, wherein said at least one panel container is movable or slidable.

8. An apparatus according to claim 6, wherein said at least one panel container has two opposite major faces and includes at an upper part thereof, a crosspiece projecting from said major faces and carrying a plurality of fixed hooks, said at least one panel container further including, at a lower part thereof, a base element provided with movement wheels.

9. An apparatus according to claim 6, wherein said support elements comprise rows of hooks disposed at the opposite sides of said at least one panel container at at least one level.

10. An apparatus according to claim 6, wherein said support elements comprise a plurality of support bars for said products, said support bars being removably sustained by said at least one panel container.

11. An apparatus according to claim 1, wherein said at least one bearing structure comprises at least one maturing shelf for supporting shaped pieces of said products, and wherein the apparatus further comprises at least one panel container housing at least one solenoid, said at least one panel container being fastenable to said at least one maturing shelf.

12. An apparatus according to claim 11, wherein said at least one panel container is removably fastened to said at least one maturing shelf.

13. An apparatus according to claim 1, wherein said at least one bearing structure comprises a plurality of superposed maturing shelves and wherein the apparatus comprises a plurality of air-core solenoids and a plurality of panel containers each housing at least one of said solenoids, said panel containers being fixed to an upper side of said maturing shelves.

14. An apparatus according to claim 1, wherein said at least one bearing structure comprises a plurality of superposed maturing shelves and wherein the apparatus comprises a plurality of air-core solenoids and a plurality of panel containers each housing at least one of said solenoids, said panel containers being fixed to a lower side of said maturing shelves.

15. An apparatus according to claim 14, wherein said panel containers are disposed under alternate maturing shelves.

16. An apparatus according to claim 11, wherein said at least one maturing shelf has at least one seating for housing said at least one solenoid.

17. An apparatus according to claim 11, comprising a plurality of air-core solenoids arranged substantially in coaxial relation with substantially cylindrical shaped pieces of said products.

18. An apparatus according to claim 1, wherein said at least one bearing structure comprises maturing shelves for said products and the apparatus further comprises at least one panel container having two opposite major faces arranged substantially perpendicularly between adjacent pairs of said maturing shelves, said at least one panel container having said at least one solenoid.

19. An apparatus according to claim 2, wherein said at least one panel container has ventilation openings passing through opposite faces of said at least one panel container at areas spaced from said at least one solenoid.

20. An apparatus according to claim 1, comprising a plurality of modular panel containers having each a substantially parallelepiped configuration and two opposite major faces, and a plurality of air-core solenoids housed in said panel containers and having axes disposed substantially perpendicularly to said major faces of said panel containers, said panel containers being removably arranged adjacent said at least one bearing structure and being connectable individually or by groups to said at least one power source.

21. An apparatus according to claim 20, wherein said at least one power source comprises at least one generator for generating a low-frequency pulsating current, said at least one generator being arranged remote from said panel containers.

22. An apparatus according to claim 2, wherein said at least one panel container includes at least one generator for generating a low-frequency pulsating current.

23. An apparatus according to claim 21, wherein said at least one generator comprises means for adjusting the intensity and/or frequency of said pulsating current.

24. An apparatus according to claim 2, wherein said at least one panel container is made of a material selected between wood and non-toxic plastic material.

25. An apparatus according to claim 1, wherein said at least one bearing structure comprises at least one panel container having a substantially parallelepiped configuration and two opposite major faces, said at least one panel container housing a plurality of air-core solenoids having respective axes disposed substantially perpendicularly to said major faces, said at least one panel container carrying a plurality of means for supporting said products, the apparatus further comprising at least one generator for generating a low-frequency pulsating current, said at least one panel container being connect able to said at least one generator and being movable independently of said at least one generator.

26. An apparatus according to claim 22, wherein said at least one generator comprises means for adjusting the intensity and/or frequency of said pulsating current.

* * * * *